(12) United States Patent
Lee et al.

(10) Patent No.: US 6,219,373 B1
(45) Date of Patent: Apr. 17, 2001

(54) WAVELET-BASED INTERFERENCE FILTERING FOR SPREAD-SPECTRUM SIGNAL

(75) Inventors: David A. Lee; Grant A. Hansen; Wei Kuo, all of Ridgecrest, CA (US)

(73) Assignee: The United States of America as represented by the Secretary of the Navy, Washington, DC (US)

( * ) Notice: Subject to any disclaimer, the term of this patent is extended or adjusted under 35 U.S.C. 154(b) by 0 days.

(21) Appl. No.: 09/106,504

(22) Filed: Jun. 15, 1998

(51) Int. Cl.[7] .................................................. A61F 2/06
(52) U.S. Cl. ....................... 375/130; 375/144; 395/200.77
(58) Field of Search ................................. 708/400, 317, 708/402, 403, 404, 405; 324/76.21; 370/210; 375/130, 350, 144, 148, 227, 285, 346, 286, 290; 395/200.77; 455/63, 67.1, 67.3, 278.1, 296; 709/247; 382/248, 276, 250, 280, 281, 261–265

(56) References Cited

U.S. PATENT DOCUMENTS

| | | | |
|---|---|---|---|
| 5,481,269 | * | 1/1996 | Imhoff et al. ........................... 342/90 |
| 5,619,998 | * | 4/1997 | Abdel-Malek et al. ........ 128/660.07 |
| 5,740,036 | * | 4/1998 | Ahuja et al. ............................. 702/17 |
| 5,802,369 | * | 9/1998 | Ganesh et al. ........................ 709/247 |
| 5,845,243 | * | 12/1998 | Smart et al. .......................... 704/230 |
| 6,011,464 | * | 1/2000 | Thuillard .............................. 340/506 |
| 6,108,609 | * | 8/2000 | Qian et al. .............................. 702/66 |

\* cited by examiner

Primary Examiner—Chi Pham
Assistant Examiner—Emmanuel Bayard
(74) Attorney, Agent, or Firm—David Kalmbaugh

(57) ABSTRACT

Interference from a spread-spectrum signal (e.g., GPS) is filtered out utilizing a wavelet-based method. A wavelet packet decomposition scheme generates a first plurality of coefficient sets from the signal(s). An entropy measurement is determined for each resulting wavelet decomposition level. Portions of the spread-spectrum signal occurring above the noise floor for the wavelet decomposition level having the lowest entropy measurement are then filtered out so that a revised coefficient set is generated therefor. As a result, a second plurality of coefficient sets can be formed such that the first plurality of coefficient sets differs from the second plurality of coefficient sets only by the revised coefficient set. A new signal is formed by applying a wavelet packet reconstruction scheme to the second plurality of coefficient sets.

20 Claims, 1 Drawing Sheet

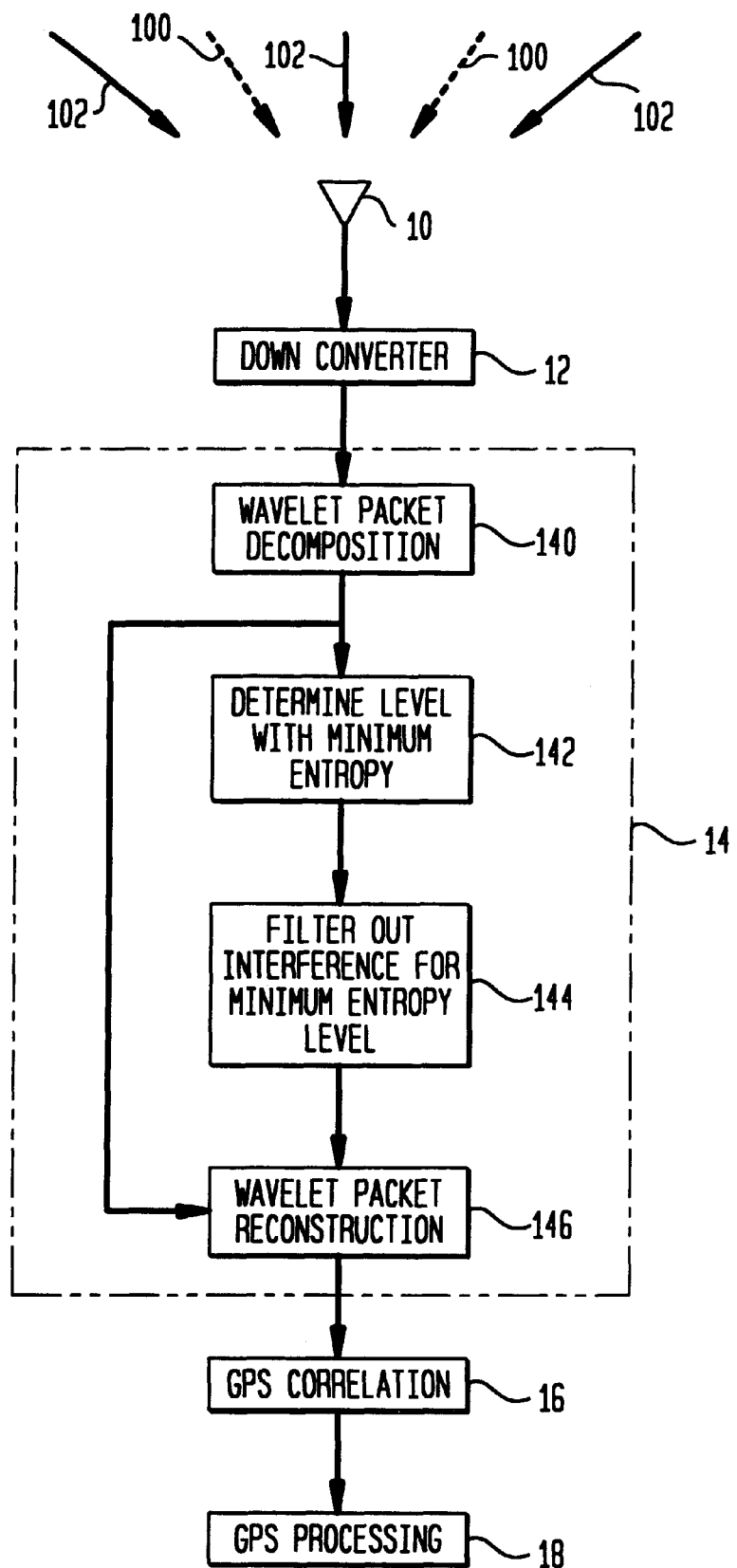

WAVELET-BASED INTERFERENCE FILTERING FOR SPREAD-SPECTRUM SIGNAL

FIELD OF THE INVENTION

The invention relates generally to the filtering of interference from a spread-spectrum signal, and more particularly to a wavelet-based method of filtering interference from low-power spread-spectrum signals such as those output from GPS or GLONASS satellites.

BACKGROUND OF THE INVENTION

The Global Positioning System (GPS) constellation of satellites transmits a 10-Watt signal from space. The power level of the signal on earth is −166 dBW or about 20 dB below the radio frequency (RF) L-band noise floor of a typical earth environment. Since the GPS signals are spread-spectrum modulated, the process gain of 43 dB (for L2 band) is sufficient to recapture the low-power signal. However, GPS bands are subject to interference from cell phones, television broadcast harmonics as well as the intentional jamming thereof. Because of the widespread adoption of GPS for military and commercial navigation, inadvertent interference as well as jamming from hostile parties represents a potentially serious problem.

Several antenna concepts have been developed to mitigate interference for GPS receivers. For example, controlled-radiation pattern antennas (CRPA) are currently being considered in several weapons systems as an anti-jam element. The CRPA operates using spatial filtering techniques. More specifically, assuming a stable platform and constant radiation, a CRPA drives an antenna null in a direction of received interference. However, drawbacks associated with CRPA's include it's cost, variable convergence delay, aerodynamic penalty, radar cross-section and performance limits.

As an alternative to antenna-based anti-jam systems and methods, classical digital signal processing (DSP) can be used to discriminate signals in the electromagnetic spectral frequency. Classical DSP (e.g., uniform scale Fourier Transform) is best applied to stationary signals or those signals having constant statistical properties. However, if the interference is dynamic (i.e., non-stationary), neither classical DSP techniques nor CRPA's perform well.

SUMMARY OF THE INVENTION

Accordingly, it is an object of the present invention to provide a method of filtering interference from a spread-spectrum signal.

Another object of the present invention is to provide a method of filtering interference from low-power spread-spectrum signals occurring below the receiving environment's noise floor.

Still another object of the present invention is to provide a method of filtering dynamic types of interference from GPS signals.

Yet another object of the present invention is to provide a method of filtering interference from GPS signals utilizing existing GPS receiver hardware and systems.

Other objects and advantages of the present invention will become more obvious hereinafter in the specification and drawings.

In accordance with the present invention, a method is provided for filtering out interference from a spread-spectrum signal such as GPS signals. A wavelet packet decomposition scheme is applied to a spread-spectrum signal having a known noise floor to generate a first plurality of coefficient sets. Each coefficient set corresponds to a unique wavelet decomposition level. An entropy measurement is determined for each wavelet decomposition level using a corresponding one of the first plurality of coefficient sets. Portions of the spread-spectrum signal occurring above the noise floor for the wavelet decomposition level having the lowest entropy measurement are then filtered out so that a revised coefficient set is generated therefor. As a result, a second plurality of coefficient sets can be formed such that the first plurality of coefficient sets differs from the second plurality of coefficient sets only by the revised coefficient set. A new signal is formed by applying a wavelet packet reconstruction scheme to the second plurality of coefficient sets.

BRIEF DESCRIPTION OF THE DRAWINGS

The sole figure is a schematic diagram illustrating the wavelet-based method of the present invention as it relates to the removal of interference from GPS signals.

DETAILED DESCRIPTION OF THE INVENTION

Referring now to the sole figure, the method of the present invention will be described as it relates to the reduction or removal of interference signals 100 that are received along with GPS signals 102 at an antenna 10. However, it is to be understood that the method of the present invention can be used to filter out interference mixed with any single channel (e.g., cellular phone signals) or multiple channel (e.g., GLONASS satellite signals, code division multiple access (CDMA) signals, etc.) spread-spectrum signal. In general, the method of the present invention operates to eliminate interference occurring above the noise floor defined by the receiving environment. Thus, in terms of GPS signals 102, the present invention preserves the signals at or below the noise floor because that is where the low-power GPS signals reside.

Prior to performing the processing associated with the present method, GPS signals 102 corrupted by interference 100 are translated to base-band by a down converter 12. For example, for P-code GPS having a base bandwidth of 20.46 MHz, analog-to-digital conversion rates must be 40.92 mega samples per second or higher. The resulting base-band signals are then processed in accordance with the steps contained within dashed-line box 14.

At block 140, the base-band signals undergo wavelet packet decomposition. Wavelet signal processing is a signal analysis tool in which the basis of analysis is a "wavelet", i.e., a waveform of effectively limited duration that has an average value of zero. Briefly, in wavelet packet decomposition, a signal is filtered and downsampled to produce a plurality of wavelet decomposition levels with each such level being defined by a set of coefficients. By operating this way, wavelet analysis provides the tool needed to examine small time-resolved portions of a signal. For a detail description of wavelet decomposition/reconstruction and wavelets in general, see "Wavelets: A New Tool for Signal Analysis" by Michael Misitis, Yves Misiti, George Oppenhiem and Jean-Michel Poggi, The MathWork Inc., 1996, Chapter 1 in the Wavelet Toolbox User's Guide; and chapters 2, 4 and 5 of "Applied Wavelet Analysis with S-PLUS" by Andrew Bruce and Hong-Ye Gao, Springer, Verlag, 1996.

The particular choice of wavelet packet decomposition scheme is a function of the type of interference that is to be eliminated. For example, when interference 100 is dynamic in nature or exhibits uneven power distribution across the bandwidth of interest (e.g., continuous wave (CW), CW swept, chirped, pulsed, multi-tone or blinking, just to name a few) a good choice for the wavelet packet decomposition scheme is the local cosine transform. Detail descriptions of the local cosine transform for both wavelet decomposition and reconstruction can be found in "Wavelets and Filter Banks" by Gilbert Strang, Wellesley-Cambridge Press, 1996, p. 284, and "Wavelets and Subband Coding" by Martin Vetterli, Prentice-Hall Publishers, 1995, p. 289. Other well known wavelet packet decomposition/reconstruction schemes that could also be used include the Haar, Daubechies, biorthogonal, Coif lets, symlets, Morlet, Mexican hat and Meyer schemes.

At block 142, the decomposition level having the best cost function, including the lowest entropy, is determined. It should be noted that cost function is a generic term. The S-Plus wavelet uses the following for its cost function: energy. entropy, minimax linear risk and Stein's Unbiased Risk Estimate.

To do this (i.e. process block 142), the coefficient set for each decomposition level is processed to generate an entropy measurement associated therewith. Assuming no prior knowledge of the presence or type of interference, minimum entropy can be calculated dynamically to determine the best time-frequency scale for operation. Once selected, the calculation can be repeated as needed to adjust to changing interference. In comparing the entropy measurement, full wavelet decomposition (i.e., nominally 6 levels) is required initially. Thereafter, only those levels before and after the minimum entropy level need be checked for minimum entropy.

By way of example, one entropy measurement know as the Shanon entropy measurement is determined in accordance with the relationship $$H = -\sum_{i=1}^{N} p_i^2 \ln(p_i^2)$$

where p represents the coefficients associated with the i-th decomposition level and N is the number of coefficients in a level.

The decomposition level of the GPS signal having the minimum entropy from step 142 is then filtered at step 144. More specifically, portions of the signal at the minimum-entropy decomposition level that are above the noise floor of the receiving environment are eliminated. To do this, Gaussian or other statistical techniques can be used to detect interference above the noise floor. For example, using a Gaussian technique, three standard deviations can be used as the threshold criteria. Then, the frequency bins which exceed the threshold are marked and set equal to the envelope's median absolute deviation value. In other words, the power level of the interference above the noise floor is reduced to that of the statistical threshold level. As a result, a new coefficient set is generated for the minimum-entropy decomposition level which will then be used in the wavelet packet reconstruction step 146.

At step 146, the new coefficient set generated at step 144 and the unchanged coefficient sets generated at step 140 are processed by a wavelet packet reconstruction scheme. That is, the original minimum entropy coefficient set determined at step 142 is replaced with the new coefficient set generated by filtering step 144. Thus, the reconstructed signal output from step 146 is not corrupted by interference 100.

The wavelet packet reconstruction scheme is typically the inverse of the decomposition scheme used in step 140 to minimize losses. Therefore, appropriate choices for the reconstruction scheme include inverse transforms of the schemes discussed above with respect to decomposition. The new signal(s) can then be processed normally. In terms of GPS signals 102, GPS correlation 16 and processing takes place after wavelet-based interference processing 14 due to the multiple channel nature of GPS. However, this is not necessary for single channel spread-spectrum communication.

The advantages of the present invention are numerous. The method eliminates dynamic interference and/or interference having uneven power distribution by operating in wavelet packet space. Since GPS signals are extremely weak spread-spectrum signals, their power level is well below (–20 dB) the noise floor. The spread-spectrum modulation effectively spreads the signal originating from a narrow band across the broad band so that interference above the noise floor can be detected. When interference such as a single continuous wave (CW) is above the noise, it is easily detected using thresholds based upon Gaussian or other well known statistical methods. In wavelet packet space, a single CW interference represents highly focused energy (i..e, low entropy) whereas the presence of many frequency distributed CW jammers increases the disorder (i.e., higher entropy). Since the entropy metric on a multi-resolution scale is different, the objective is to choose the best time-frequency trade space based upon minimum entropy. In least entropy cases such as highly-resolved CW tones, a very small fraction of the signal is extracted, which results in the best reconstruction. In high entropy cases such as chirps, multiple jammers, noise-like interference, more of the spectrum must be extracted.

The present method can be used as stand-alone technique or can be incorporated into existing receiver systems. In terms of GPS, the present method can be used to complement or supplement other anti-jam or interference removal systems/schemes. That is, the present method is modular in nature and could be utilized with a variety of anti-interference or jamming antenna concepts such as cross-polar antennas, CRPA's, fixed radiation pattern antennas (FRPA), and beamforming schemes.

Thus, although the invention has been described relative to a specific embodiment thereof, there are numerous variations and modifications that will be readily apparent to those skilled in the art in light of the above teachings. It is therefore to be understood that, within the scope of the appended claims, the invention may be practiced other than as specifically described.

What is claimed is:

1. A method of filtering out interference from a spread-spectrum signal, comprising the steps of:

applying a wavelet packet decomposition scheme to a spread-spectrum signal having a known noise floor wherein a first plurality of coefficient sets are generated, each of said first plurality of coefficient sets corresponding to a unique wavelet decomposition level;

determining an entropy measurement for each said wavelet decomposition level using a corresponding one of said first plurality of coefficient sets;

filtering out portions of said spread-spectrum signal occurring above said known noise floor for said wavelet decomposition level having the lowest said entropy measurement wherein a revised coefficient set is generated for said wavelet decomposition level having the lowest said entropy measurement, and wherein a second plurality of coefficient sets is formed such that said first plurality of coefficient sets differs from said second plurality of coefficient sets only by said revised coefficient set; and forming a new signal by applying a wavelet packet reconstruction scheme to said second plurality of coefficient sets.

2. A method according to claim 1 wherein said wavelet packet decomposition scheme is selected from the group consisting of local cosine, Haar, Daubechies, biorthogonal, Coiflets, symlets, Morlet, Mexican hat and Meyer wavelet packet decomposition schemes.

3. A method according to claim 1 wherein said wavelet packet reconstruction scheme is selected from the group consisting of local cosine, Haar, Daubechies, biorthogonal, Coiflets, symlets, Morlet, Mexican hat and Meyer wavelet packet reconstruction schemes.

4. A method according to claim 1 wherein said wavelet packet decomposition scheme and said wavelet packet reconstruction scheme have the same wavelet basis.

5. A method according to claim 1 wherein said step of filtering out comprises the steps of:

selecting a threshold signal level; and reducing said portions of said spread-spectrum signal to said threshold signal level.

6. A method according to claim 5 wherein said step of selecting comprises the step of applying statistical criteria.

7. A method of filtering out interference from a spread-spectrum signal, comprising the steps of:

translating a spread-spectrum signal having a known noise floor to based-band;

applying a wavelet packet decomposition scheme to said translated spread-spectrum signal wherein a first plurality of coefficient sets are generated, each of said first plurality of coefficient sets corresponding to a unique wavelet decomposition level;

determining an entropy measurement for each said wavelet decomposition level using a corresponding one of said first plurality of coefficient sets;

filtering out portions of said translated spread-spectrum signal occurring above said known noise floor for said wavelet decomposition level having the lowest said entropy measurement wherein a revised coefficient set is generated for said wavelet decomposition level having the lowest said entropy measurement, and wherein a second plurality of coefficient sets is formed such that said first plurality of coefficient sets differs from said second plurality of coefficient sets only by said revised coefficient set; and forming a new signal by applying a wavelet packet reconstruction scheme to said second plurality of coefficient sets.

8. A method according to claim 7 wherein said wavelet packet decomposition scheme is selected from the group consisting of local cosine, Haar, Daubechies, biorthogonal, Coiflets, symlets, Morlet, Mexican hat and Meyer wavelet packet decomposition schemes.

9. A method according to claim 7 wherein said wavelet packet reconstruction scheme is selected from the group consisting of local cosine, Haar, Daubechies, biorthogonal, Coiflets, symlets, Morlet, Mexican hat and Meyer wavelet packet reconstruction schemes.

10. A method according to claim 7 wherein said wavelet packet decomposition scheme and said wavelet packet reconstruction scheme have the same wavelet basis.

11. A method according to claim 7 wherein said step of filtering out comprises the steps of:

selecting a threshold signal level; and reducing said portions of said translated spread-spectrum signal to said threshold signal level.

12. A method according to claim 11 wherein said step of selecting comprises the step of applying statistical criteria.

13. A method of filtering out interference from GPS signals occurring below a known noise floor, comprising the steps of:

translating GPS signals to based-band;

applying a wavelet packet decomposition scheme to said base-band GPS signals wherein a first plurality of coefficient sets are generated, each of said first plurality of coefficient sets corresponding to a unique wavelet decomposition level;

determining an entropy measurement for each said wavelet decomposition level using a corresponding one of said first plurality of coefficient sets;

filtering out portions of said base-band GPS signals occurring above said known noise floor for said wavelet decomposition level having the lowest said entropy measurement wherein a revised coefficient set is generated for said wavelet decomposition level having the lowest said entropy measurement, and wherein a second plurality of coefficient sets is formed such that said first plurality of coefficient sets differs from said second plurality of coefficient sets only by said revised coefficient set; and forming new signals by applying a wavelet packet reconstruction scheme to said second plurality of coefficient sets, wherein said new signals are formed prior to GPS correlation.

14. A method according to claim 13 wherein said wavelet packet decomposition scheme is selected from the group consisting of local cosine, Haar, Daubechies, biorthogonal, Coiflets, symlets, Morlet, Mexican hat and Meyer wavelet packet decomposition schemes.

15. A method according to claim 13 wherein said wavelet packet reconstruction scheme is selected from the group consisting of local cosine, Haar, Daubechies, biorthogonal, Coiflets, symlets, Morlet, Mexican hat and Meyer wavelet packet reconstruction schemes.

16. A method according to claim 13 wherein said wavelet packet decomposition scheme and said wavelet packet reconstruction scheme have the same wavelet basis.

17. A method according to claim 13 wherein said step of filtering out comprises the steps of:

selecting a threshold signal level; and reducing said portions of said base-band GPS signals to said threshold signal level.

18. A method according to claim 17 wherein said step of selecting comprises the step of applying statistical criteria.

19. A method according to claim 13 wherein, when the interference includes continuous wave, continuous wave swept, chirped, pulsed, multi-tone or blinking types of interference, said wavelet decomposition scheme is local cosine.

20. A method according to claim 19 wherein said wavelet packet reconstruction scheme is local cosine.

* * * * *

UNITED STATES PATENT AND TRADEMARK OFFICE
CERTIFICATE OF CORRECTION

PATENT NO.     : 6,219,373 B1
DATED          : April 7, 2001
INVENTOR(S)    : David A. Lee, Grant A. Hanson and Wei Kuo It is certified that error appears in the above-identified patent and that said Letters Patent is hereby corrected as shown below:

<u>Title page,</u>
Item [75], Inventor, "Grant A. Hansen" should read -- Grant A. Hanson --.

Signed and Sealed this

Eleventh Day of February, 2003

JAMES E. ROGAN
*Director of the United States Patent and Trademark Office*